United States Patent [19]
Hickman et al.

[11] Patent Number: 6,035,648
[45] Date of Patent: Mar. 14, 2000

[54] METHOD OF CHARGING AND RECHARGING A REFRIGERATION SYSTEM CONTAINING A TERNARY REFRIGERANT

[75] Inventors: Kenneth E. Hickman, York; John F. Judge, Stewartstown, both of Pa.

[73] Assignee: York International Corporation, York, Pa.

[21] Appl. No.: 09/127,984

[22] Filed: Aug. 3, 1998

[51] Int. Cl.[7] .................................................. F25B 45/00
[52] U.S. Cl. .................................. 62/77; 62/149; 62/129; 62/102; 62/114; 62/502; 62/127
[58] Field of Search .............................. 62/149, 129, 77, 62/102, 114, 502, 127

[56] References Cited

U.S. PATENT DOCUMENTS

| | | | |
|---|---|---|---|
| 5,363,661 | 11/1994 | Condit et al. | 62/77 |
| 5,363,662 | 11/1994 | Todack | 62/85 |
| 5,377,493 | 1/1995 | Friedland | 62/149 |
| 5,410,887 | 5/1995 | Urata et al. | 62/129 |
| 5,438,849 | 8/1995 | Yoshida et al. | . |
| 5,471,848 | 12/1995 | Major et al. | 62/149 |
| 5,606,862 | 3/1997 | Peckjian et al. | 62/149 |
| 5,626,026 | 5/1997 | Sumida et al. | . |
| 5,647,222 | 7/1997 | Sarakinis | 62/129 |
| 5,647,224 | 7/1997 | Kushiro et al. | . |
| 5,685,163 | 11/1997 | Fujita et al. | . |
| 5,711,158 | 1/1998 | Yoshida et al. | 62/77 |

*Primary Examiner*—Henry Bennett
*Assistant Examiner*—Mark Shulman
*Attorney, Agent, or Firm*—Finnegan, Henderson, Farabow, Garrett & Dunner, L.L.P.

[57] ABSTRACT

A method of charging and recharging a refrigerant loop with a ternary refrigerant composition, wherein substantially equal proportions of difluoromethane and pentafluoroethane are added to the loop in substantially equal proportion by mass, during the step of charging and recharging.

10 Claims, No Drawings

METHOD OF CHARGING AND RECHARGING A REFRIGERATION SYSTEM CONTAINING A TERNARY REFRIGERANT

BACKGROUND OF THE INVENTION

A. Field of the Invention

The present invention relates to the field of refrigeration and air conditioning. In particular, the present invention relates to the use of ternary refrigerants in refrigeration air conditioning, or heat pump applications and methods of charging and recharging such systems' refrigerants, particularly after some refrigerant has leaked.

B. Description of the Prior Art

Chlorofluorocarbon refrigerants present a threat to the earth's ozone layer. Accordingly, practitioners in the air conditioning and refrigeration art have long sought refrigerant compositions which are as effective as these commonly used chlorofluorocarbon refrigerants, but which are also safe for use in the environment.

Monochlorodifluoromethane, R-22, is one such chlorofluorocarbon refrigerant. (An R-number designation is applied to all commonly used refrigerants by the American Society of Heating, Refrigeration and Air Conditioning Engineers ("ASHRAE"). The R-numbers used herein correspond to the ASHRAE designations, which are widely used by practitioners). This refrigerant unfortunately has some detrimental characteristics, particularly environmental ones.

Practitioners have long searched for an environmentally friendly substitute for R-22. One such practical substitute known in the art is R-407C. R-407C is a ternary refrigerant comprising difluoromethane ("R-32"), pentafluorethane ("R-125") and 1,1,1,2-tetrafluoroethane ("R-1 34a") combined in a mass ratio of 23/25/52, respectively.

While the use of R-407C has environmental benefits over R-22, its use poses certain challenges in practice. One challenge faced by practitioners is that when the composition of the refrigerant changes, for example due to a leak in the refrigeration system, the R-407C composition is difficult to reconstitute. For example, in the case of a vapor leak from an idle system, the respective refrigerants may be lost to different degrees, because each of the three refrigerants has different characteristics. The practitioner normally will not know the extent of the leak and the precise amounts of the respective refrigerants that have evaporated. It therefore will be difficult for a practitioner to know what relative amounts of R-32, R-125, and R134a to add in order to reconstitute the R-32/R-125/R-134a mass ratio. Because these components are present in different relative amounts, the practitioner must add differing amounts of each component separately, based on either a guess, or some type of calculation based on known or sensed parameters. To make matters worse, R-32 is flammable, rendering its presence alone as an independent additive for reconstituting R-407C a safety hazard.

SUMMARY OF THE INVENTION

The objects of the invention are to provide a method of charging and recharging a refrigeration loop with a ternary refrigerant which is easily replaced in the event of leakage from a refrigerant system.

Another object is to provide a method of recharging R-407C, and other acceptable ternary refrigerant compositions, in a safe and economical manner.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises the steps of initially charging a refrigerant loop with a refrigerant composition consisting essentially of a ternary mixture of difluoromethane (R-32), pentafluorethane (R-125) and 1,1,1,2-tetrafluoroethane (R-134a), wherein difluoromethane and pentafluoroethane are present in substantially equal proportions by mass, and recharging the refrigerant in the loop by adding a mixture of difluormethane and pentafluoroethane wherein the mixture contains difluormethane and pentafluoroethane in substantially equal proportions by mass. One such mixture to be added to recharge the refrigerant is R-410A refrigerant.

As embodied and broadly described herein, the invention comprises a method of adjusting the composition of an original ternary refrigerant in a refrigeration system comprising: adding to the original ternary refrigerant difluoromethane and pentafluoroethane at the same time in substantially equal proportions by mass.

In one preferred embodiment, the initial charge of refrigerant is one in which the respective mass ratios of R-32, R-125, and R-134a is 25, 25, and 50.

In another embodiment the refrigerant loop is initially charged with R-407C refrigerant and is recharged by the addition of R-410A refrigerant.

It is to be understood that both the foregoing general description and the following detailed description are exemplary and explanatory only and are not restrictive of the invention, as claimed.

DESCRIPTION OF THE PREFERRED EMBODIMENT(S)

A vapor compression refrigeration system generally comprises a compressor, a condenser, an expander, and an evaporator connected in a loop. Other elements may be included in the system, for example, an accumulator is frequently placed between the evaporator and the compressor, and control instrumentation may be placed on the system in a manner known to those of ordinary skill in the art.

In practice, a refrigerant composition change can occur for a variety of reasons, anywhere in the system. For example, a vapor leak of refrigerant from an idle system may create an uncertainty with respect to the ultimate refrigerant composition.

The inventors herein have observed that when a vapor leak occurs in a system containing R-407C, R-32 and R-125 behave almost as a single component. Generally, the inventors have found that R-32 and R-125 evaporate preferentially at about the same rate, since they are the more volatile components. In typical vapor leaks, less R-134a refrigerant is lost than the more volatile components. By assuming that R-32 and R-125 behave as a single component, it is possible to recharge the refrigerant to close if not identical to its original composition by adding R-410A refrigerant (containing equal parts of R-32 and R-125) until the loop is fully charged with refrigerant. By following this method, the refrigerant can be recharged simply, economically and safely, by simply using a single bottle or source of R-410A. This methods overcomes the need to make a sophisticated analysis of the remaining refrigerant in the loop and adding specific portions of each of R-32, R-125, and R-134a, if needed.

As a further refinement of this technique, the inventors have developed the concept of charging a loop with a ternary mixture of R-32 and R-125 in a 50/50 mass ratio, along with an appropriate amount of R-134a. For example, the resultant ternary mixture could be, by mass, 50% R-134a, 25% R-32, and 25% R-125. The use of this 50/50 mixture as a component of a ternary refrigerant increases the probability that the R-32 and R-125 will evaporate at close to the same degree, whether the leakage is small or more extensive. The inventors have discovered that a ternary mixture comprised of R-410A (itself a binary mixture of R-32 and R-125 in 50/50 proportion by mass) and R-134a exhibits advantageous properties over the prior art compositions. In particular, the inventors have found that it is easier to maintain and adjust the composition of a R-410A/R-134a mixture when the composition changes due to fractionation.

The practice of the invention may take several forms. In a preferred embodiment, a mixture of R-410A and R-134a can be combined to make the original charge of refrigerant to a system. In the more preferred embodiment R-134a is present in an amount 40–60% by mass. In the most preferred embodiment, R134a is present in an amount 46 to 54% by mass. If refrigerant is lost through a leak, the loop can be recharged by addition of R-410A refrigerant from a single bottle or similar source.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of charging and recharging a refrigeration system comprising the steps of:

initially charging a refrigerant loop with a refrigerant composition consisting essentially of a ternary mixture of difluoromethane (R-32), pentafluorethane (R-125) and 1,1,1,2-tetrafluoroethane (R-134a), wherein difluoromethane and pentafluoroethane are present in substantially equal proportions by mass; and recharging the refrigerant in the loop by adding a mixture of difluormethane and pentafluoroethane wherein the mixture contains difluormethane and pentafluoroethane in substantially equal proportions by mass.

2. The method of claim 1, further comprising the step of determining that a portion of the initial charge of refrigerant has leaked, before performing the step of recharging.

3. The method of claim 2, wherein the step of recharging includes the step of adding an amount of mixture that is substantially equal to the amount of initial charge of refrigerant that has leaked.

4. The method of claim 1 wherein the step of charging comprises charging the refrigerant loop with a mixture of R-410A and R-134a.

5. The method of claim 1, wherein the step of charging comprises charging the refrigerant loop with R-407C.

6. The method of claim 1, wherein the initial charge of refrigerant includes approximately 40% to 60% of R-134a by mass.

7. The method of claim 6 wherein the step of recharging consists essentially of adding R-410A to the refrigeration loop.

8. A method of adjusting the composition of an original ternary refrigerant in a refrigerant loop comprising:

adding to the original ternary refrigerant difluoromethane and pentafluoroethane at the same time in substantially equal proportions by mass.

9. The method of claim 8, wherein the step of recharging consists essentially of adding R-410A to the refrigerant loop.

10. The method of claim 8 wherein the original ternary refrigerant is R-407C.

* * * * *